AUTOMATIC GAIN CONTROL OF DEMODULATING SIGNALS

Filed June 28, 1955 5 Sheets-Sheet 1

INVENTORS
NORBERT D. LARKY AND
CARMEN LOUIS CUCCIA
BY [signature]
ATTORNEY

April 18, 1961 N. D. LARKY ET AL 2,980,760

AUTOMATIC GAIN CONTROL OF DEMODULATING SIGNALS

Filed June 28, 1955 5 Sheets-Sheet 2

INVENTORS
NORBERT D. LARKY AND
CARMEN LOUIS CUCCIA
BY
[signature]
ATTORNEY

AUTOMATIC GAIN CONTROL OF DEMODULATING SIGNALS

Filed June 28, 1955

INVENTORS
NORBERT D. LARKY AND
CARMEN LOUIS CUCCIA
BY [signature]
ATTORNEY

April 18, 1961 N. D. LARKY ET AL 2,980,760

AUTOMATIC GAIN CONTROL OF DEMODULATING SIGNALS

Filed June 28, 1955 5 Sheets-Sheet 4

INVENTORS
NORBERT D. LARKY AND
CARMEN LOUIS CUCCIA
BY [signature]
ATTORNEY

April 18, 1961 N. D. LARKY ET AL 2,980,760

AUTOMATIC GAIN CONTROL OF DEMODULATING SIGNALS

Filed June 28, 1955 5 Sheets-Sheet 5

INVENTORS
NORBERT D. LARKY AND
CARMEN LOUIS CUCCIA
BY [signature]
ATTORNEY 2,980,760

AUTOMATIC GAIN CONTROL OF DEMODULATING SIGNALS

Norbert David Larky, Somerville, and Carmen Louis Cuccia, Princeton, N.J., assignors to Radio Corporation of America, a corporation of Delaware Filed June 28, 1955, Ser. No. 518,453

14 Claims. (Cl. 178—5.4)

The present invention relates to improved circuits for controlling the amplitude of demodulated chrominance signal information and more particularly to manual and automatic chroma control and automatic color balance in a color television receiver.

The color television signal conforming to the U.S. standards established by the Federal Communications Commission on Dec. 17, 1953, includes a luminance or brightness signal and a chrominance signal. The chrominance signal is a modulated subcarrier having a mean frequency of 3.58 mc. The modulations of the chrominance signal represent color difference signals each of which when added to the luminance signal produces a signal which is completely representative of one of the colors of the scene. Color difference signal information in the chrominance signal describes a wide gamut of colors with each phase angle of the chrominance signal corresponding to a color difference signal and the amplitude of the chrominance signal at that phase angle representing the saturation corresponding to that chrominance signal when considered in combination with the contributions to saturation made by the luminance signal.

Each of the color difference information signals, represented by the modulations of the modulated subcarrier, may be demodulated by synchronous detection. Synchronous detection of a color difference signal from the chrominance signal involves the heterodyning of the modulated subcarrier with a locally generated reference signal having a phase corresponding to the phase in the modulated subcarrier of that color difference information signal. In order that reference signals of accurately maintained phase can be produced in a color television receiver, color synchronizing bursts of approximately 8 cycles of the modulated subcarrier frequency are included on the "back porch" of the horizontal synchronizing pulse.

In a color television receiver, means must be provided for controlling the amplitude of the demodulated color difference signal information. In many color television receivers, for example, automatic chroma control is often utilized for optimum performance. Automatic chroma control provides the function of maintaining the output signals of the synchronous demodulators at a relatively constant amplitude level regardless of fluctuations in the amplitude level of the chrominance signal as received by the color television receiver. Also, in color television receivers utilizing sequential color image reproducers, adjustment of the amplitude level of the component color information to account for differences in the amplitude level of the transmitted component information signals and the differences in light-emission efficiency of various phosphor areas in the color image reproducer will yield color balance of the reproduced color image.

It is therefore an object of this invention to provide an improved means for controlling the amplitude level of the color difference information signal in a color television receiver.

It is a still further object of this invention to provide an improved automatic chroma control circuit for a color television receiver.

It is a yet further object of this invention to provide a simplified means for controlling the amplitude level of synchronous demodulator signals at the output of a synchronous demodulator in a color television receiver.

It is a still further object of this invention to provide an improved and simplified means for maintaining color balance in a color television receiver employing a sequential color image reproducer.

According to the present invention, control of the amplitude level of the color difference information signals in a color television receiver may be achieved by controlling the amplitude of the reference signal provided to the synchronous demodulators.

In one form of the present invention, automatic chroma control is achieved by causing the amplitude level of the reference signal applied to the synchronous demodulators to vary inversely as the amplitude level of the chrominance signal.

In another form of the present invention, color balance in a color television receiver employing a sequential color image reproducer may be achieved by controlling the amplitude level of each of a sequence of suitably phased reference signals applied to a synchronous demodulator.

Other and incidental objects of this invention will become apparent upon a reading of the following specification and a study of the drawing, wherein.

In a chrominance signal demodulator circuit, both the chrominance signal and a reference signal having the phase of the color difference signals to be demodulated are applied to the synchronous demodulator. The output level of the color difference signals demodulated by the synchronous demodulator according to the present invention, will be controlled by controlling the amplitude of the reference signal. The present invention may therefore be utilized for providing, for example, manual chroma control, automatic chroma control and color balance controls in color television receivers. It is to be appreciated that by providing the control functions in the reference signal channels of the synchronous demodulator, a minimum of control is required in the chrominance signal channel thereby minimizing distortion and deterioration of signals which may be introduced by chroma control circuits which control the amplitude of the chrominance signal rather than the amplitude of the reference signal.

Figure 1:
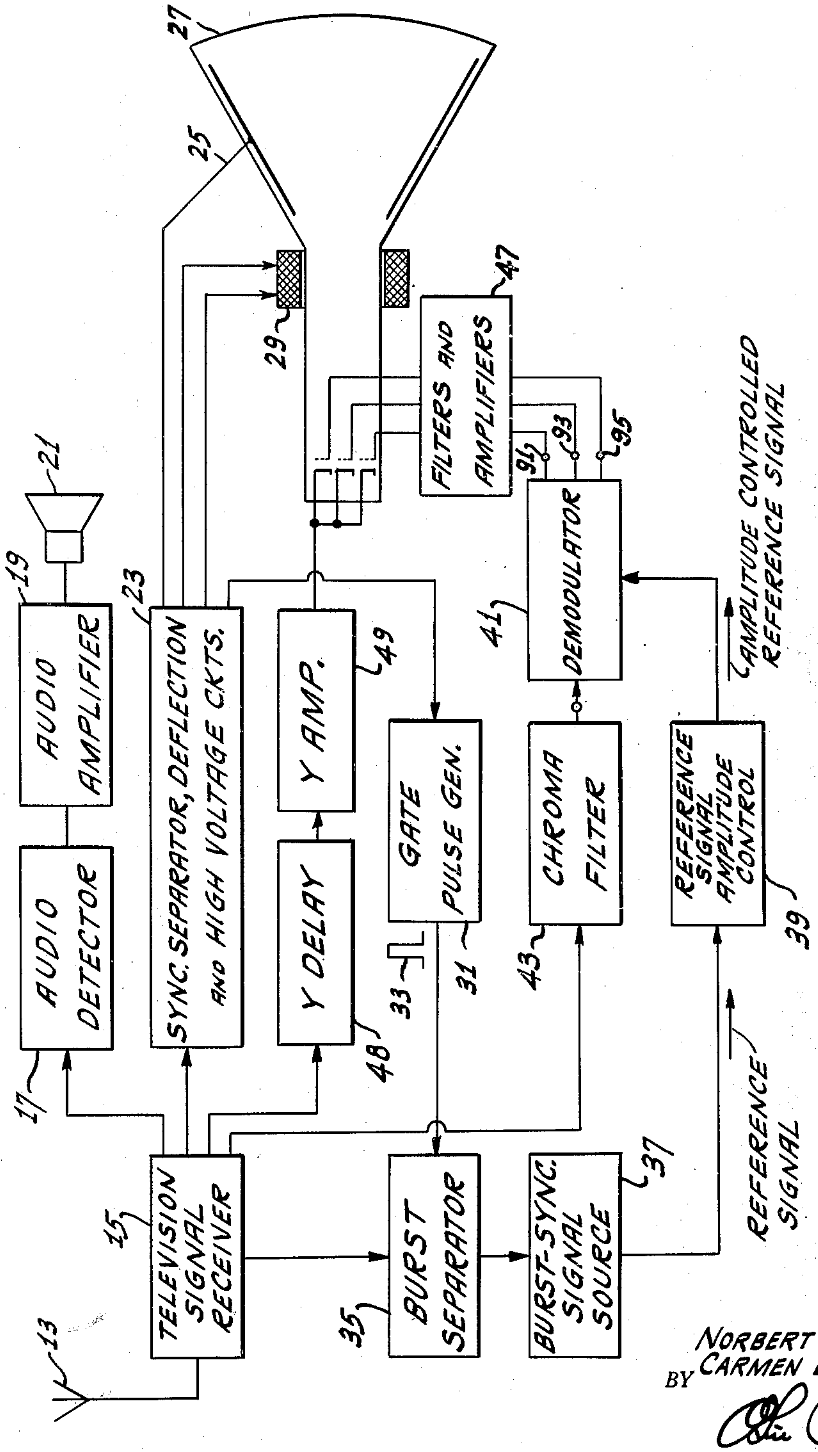
Figure 1 shows a block diagram of one form of the present invention.

Figure 1 is a block diagram of a color television receiver employing one form of the present invention. The incoming color television signal is received at the antenna 13 and demodulated in the television signal receiver 15. The demodulated color television signal contains not only the luminance and chrominance signal but also the picture and color synchronizing signals and also the audio information which is transmitted on a frequency modulated carrier 4½ mc. removed from the picture carrier. The television signal receiver 15 performs the function of color-television-signal demodulation in a manner well known in the art; for a description of the operation of a television signal receiver for the demodulation of television signals, see, for example, the article entitled "Television Receivers" by Antony Wright in the March 1947 issue of the RCA Review.

The demodulated color television signal is applied to the audio detector 17 where using, for example, an intercarrier sound circuit, the audio information is demodulated. The demodulated audio information is thereupon applied to the audio amplifier 19 where it is amplified to a suitable amplitude level and then applied to the loud speaker 21.

The demoduated color television signal is applied to the sync separator, deflection and high voltage circuits 23 which apply a high voltage to the ultor 25 of the kinescope 27, deflection signals to the yokes 29, and an energizing signal to the gate pulse generator 31. The output of the gate pulse generator is the gate pulse 33 which has a duration interval substantially equal to and in time coincidence with the duration interval of the color synchronizing bursts. Both the gate pulse 33 and the demodulated color television signal are applied to the burst separator 35 wherein the color synchronizing burst is separated from the color television signal. The separated color synchronizing bursts are thereupon applied to the burst sync signal source 37.

The burst sync signal source 37 is a reference signal generator which may, for example, consist of an oscillator capable of being reactance-tube frequency-controlled or injection-locked by the separated bursts or may consist of a ringing circuit designed to ring with substantially constant-amplitude responsive to the color synchronizing bursts. The reference signal from the burst-sync signal source 37 is applied by way of the reference signal amplitude control circuit 39 to the demodulator 41. The reference signal amplitude control circuit 39 controls the amplitude of the reference signal according to the present invention.

The demoduated color television signal is applied to the chroma filter 43 which separates the chrominance signal from the color television signal and applies the chrominance signal to the demoduators 41. The demodulators 41, utilizing circuits of the type, for example, described by Pritchard and Rhodes in their paper entitled "Color Television Signal Receiver Demodulators" published in the RCA Review in the June 1953 issue, provides a trio of color difference signals namely, $R-Y$, $G-Y$ and $B-Y$ signals, where Y denotes the luminance signal.

According to the present invention, the amplitude of each of the trio of color difference signals will be dependent upon the amplitude of the reference signal as controlled by the reference signal amplitude control circuit 39. The reference signal amplitude control circuit 39 may take the particular form of a potentiometer for providing manual control of the amplitude of the reference signal or may take the form of an automatic control circuit or a controlled-amplitude-control circuit wherein the reference signal is amplitude controlled as a function of time or by a controlling signal provided by the color television receiver.

In the color television circuit of Figure 1, the trio of demodulated color difference signals demoduated by the demodulators 41 are filtered or undesirable components and applied by way of the filters and amplifiers 47 to the control grids of the kinescope 27. The color television signal in the form of the luminance or Y signal is applied to the cathodes of the kinescope 27 by way of the Y delay line 48 and the Y amplifier 49 to cause addition of the luminance and color difference signals to take place in the electron guns of the kinescope 27 resulting in a reproduction of the televised color image by the kinescope 27.

It is to be appreciated that addition of the luminance signal and the color difference signal may be performed in circuits separate from the kinescope, with the resulting component color signals then applied to appropriate control electrodes of the kinescope 27 or of any suitable color image reproducer.

Figure 2:
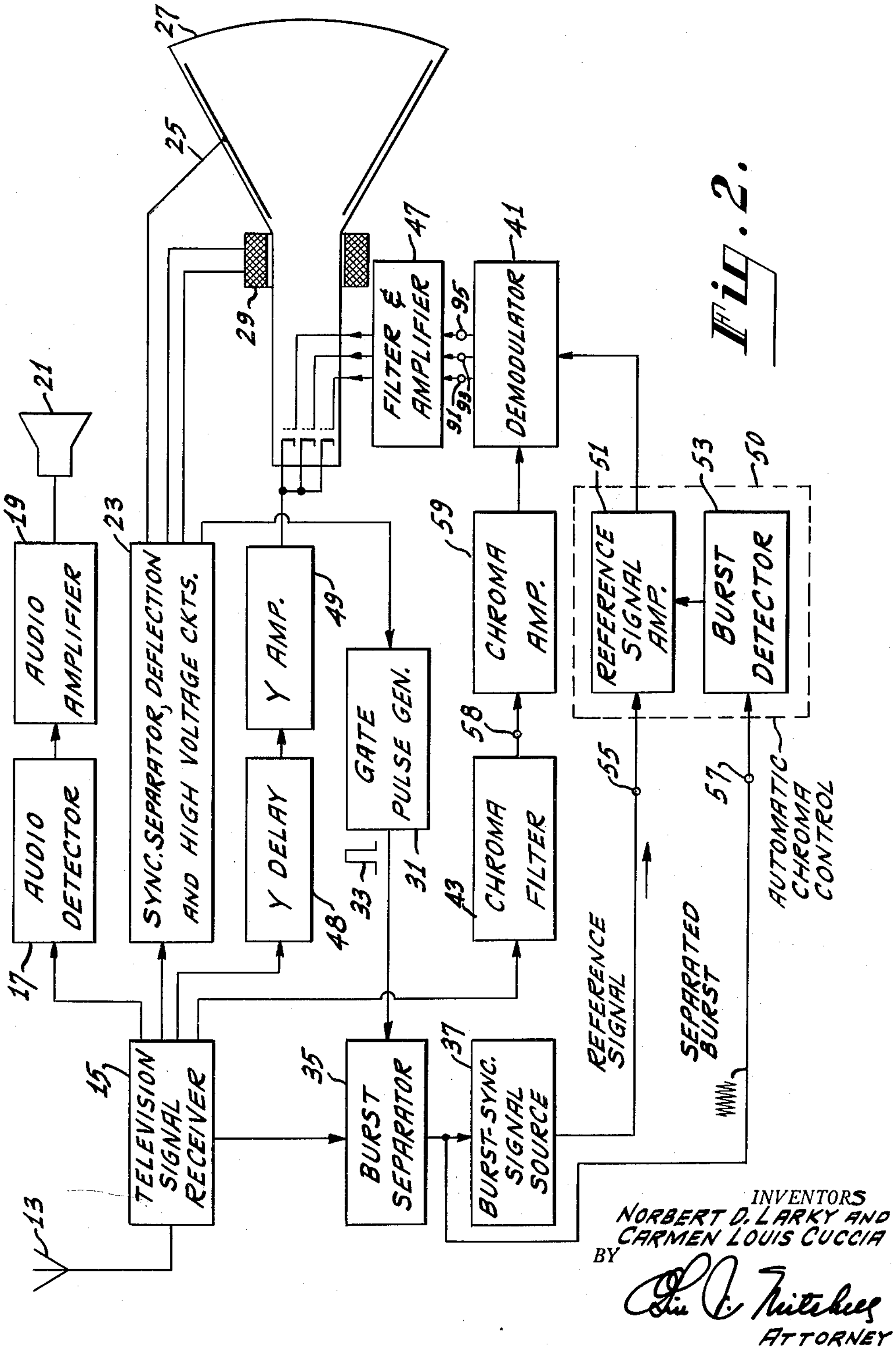
Figure 2 shows a block diagram of an automatic chroma control circuit in a color television receiver.

Figure 2 is a block diagram of a color television receiver employing automatic chroma control according to the present invention. Circuits providing the same functions as those described in connection with Figure 1 are assigned the same numerals.

Automatic chroma control is particularly useful in a color television receiver wherein they cause the amplitude level of the demodulated color difference signals provided by say the demodulators 41, to be relatively independent of the amplitude level of the chrominance signal in the demodulated color television signal. It is to be appreciated that as a result of fading, multipath reception, or atmospheric disturbances, the chrominance signal can change in amplitude thereby resulting in fluctuation in color difference signal amplitude level which in turn provides highly undesirable fluctuations in the saturation of the televised image reproduced by a color image reproducer. However, the amplitude level of the color synchronizing bursts, having the frequency of the mean frequency of the chrominance signal, provides an excellent indication of the signal strength of the chrominance signal; the automatic chroma control circuit of the form illustrated in Figure 2 therefore utilizes this burst amplitude level for controlling the amplitude of the reference signal applied to the demodulator so that the color difference signals developed at the output of the demodulators 41 will be independent of the signal strength of the chrominance signal. The block diagram of Figure 2 shows typically an automatic chroma control circuit 50 which includes a reference signal amplifier 51 and a burst detector 53. The reference signal amplifier 51 is supplied with a reference signal from the burst sync signal source 37 by way of terminal 55. The burst detector 53 is supplied with a separated burst from the burst separator 35 by way of terminal 57. The burst detector 53 detects the separated burst and develops a control voltage which is indicative of the signal strength of the color synchronizing burst and therefore of the chrominance signal. This control voltage is applied to the reference signal amplifier 51 to control the gain of this amplifier whereby the amplitude of the reference signal applied to the demodulator 41 is adjusted to cause the demodulated color difference signals to have an amplitude level substantially independent of the amplitude of the chrominance signal applied to the demodulator 41 by way of the chrominance amplifier 59.

Figures 3, 5:
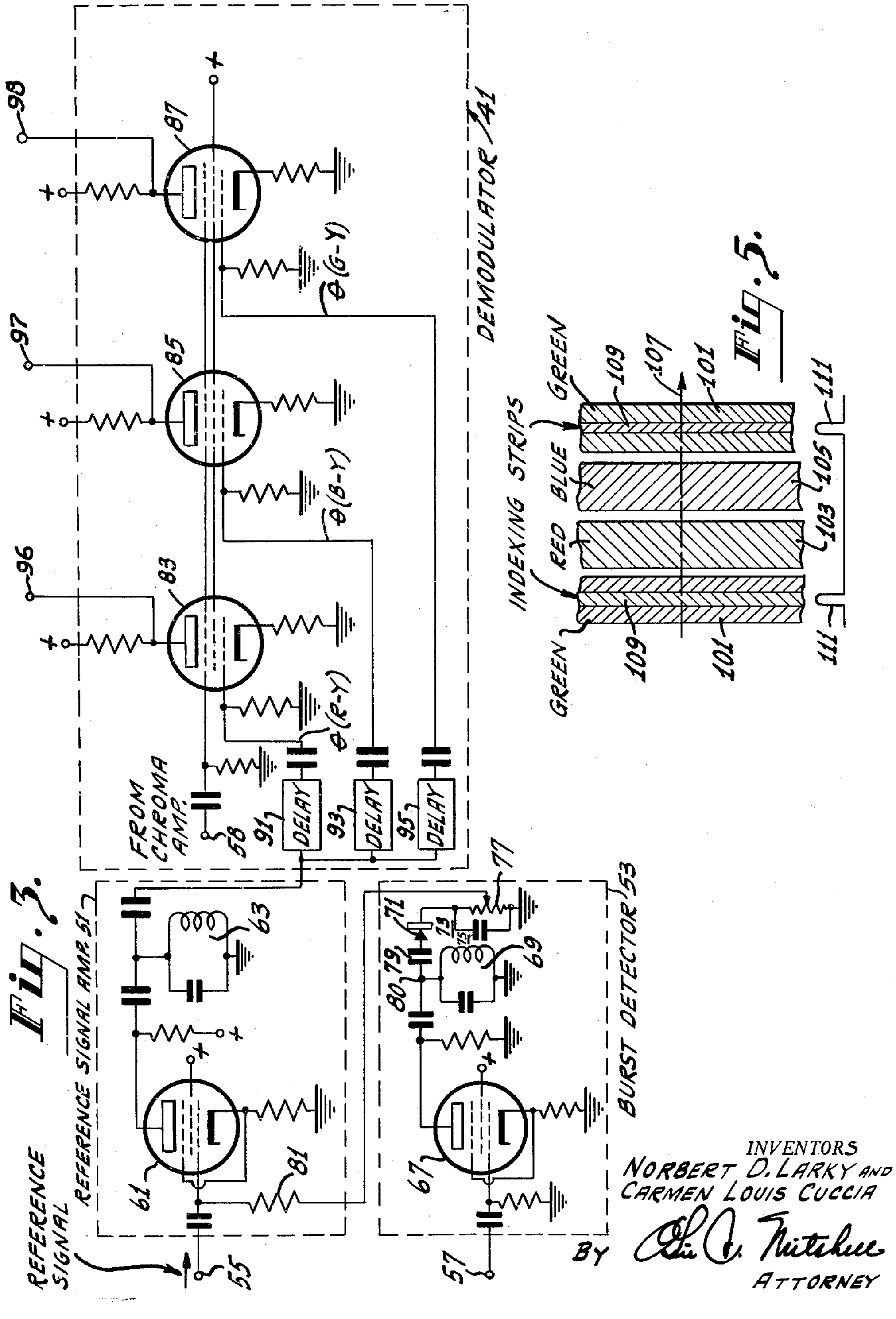
Figure 3 is a schematic diagram of the automatic chroma control circuit and demodulators of the block diagram of Figure 2.
Figure 5 illustrates line phosphor strips and indexing strips utilized on the target area of the color image reproducer of the color television receiver of Figure 4.

Figure 3 is a schematic diagram of circuits representing typically, the reference signal amplifier 51, the burst detector 53, and the demodulator 41 of Figure 2. The reference signal amplifier 51 of Figure 3 consist of a pentode 61 to whose control grid the reference signal is applied by way of terminal 55. In the output circuit of the pentode 61 is the resonant circuit 63 which is tuned to the frequency of the color synchronizing bursts. The signal developed across the resonant circuit 63 is therefore a continuous signal having the frequency of the color synchronizing bursts and a phase prescribed by the burst. The gain of pentode 61 will be dependent upon the bias voltage delivered to the control grid of this pentode by the burst detector 53 by way of resistor 81.

The burst detector 53 is supplied with the separated burst which is developed at terminal 57. The separated burst is applied to the control grid of the pentode 67 and is caused to be developed across the resonant circuit 69 which has a resonant frequency at the frequency of the color synchronizing bursts. The rectifier 71 and the resistance-condenser network 73, made up of the condenser 75 and potentiometer 77, are connected serially with the condenser 79 from the off-ground terminal 80 of the resonant circuit 69 to ground. A control voltage representing the detected color synchronizing bursts and therefore indicative of the amplitude of the chrominance signal is produced across the potentiometer 77. The polarity of this control voltage is selected so that when applied to the control grid of pentode 61 by way of resistor 81, the output signal of the reference signal amplifier 51 varies in a manner calculated to cause the output signals of the demodulator 41 to be substantially independent of the amplitude of the chrominance signal supplied by the chroma filter 43 to the demodulator 41.

Figure 6:
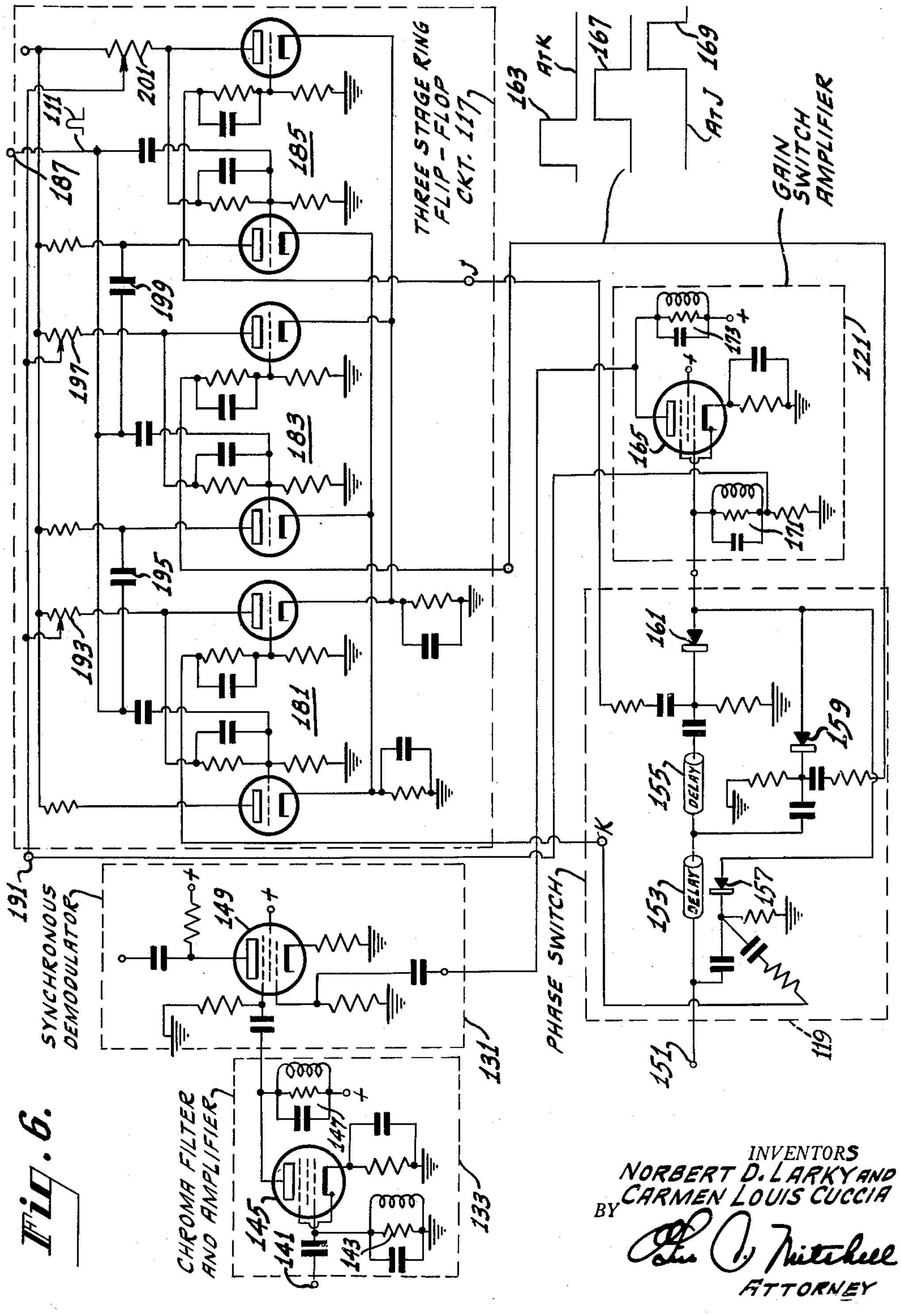
Figure 6 is a schematic diagram of the color balance and color sequencing circuit of Figure 4.

The demodulator 41 illustrates one typical form of demodulator circuit for producing a trio of color difference signals from the chrominance signal using pentode demodulators of the type illustrated in Figure 6 of the Pritchard and Rhodes publication. The chrominance signal from the chroma filter 43 is applied to each of the third grids of the pentodes 83, 85 and 87 by way of the terminal 58. The reference signal from the reference signal amplifier 51 is subjected to time delay in each of delay circuits 91, 93 and 95 so that the reference signal is applied with the phases of the R—Y, B—Y and G—Y signals in the chrominance signal to the control grids of each of the pentodes 83, 85 and 87, respectively. Synchronous demodulation of the R—Y, B—Y and G—Y color difference signals is thereupon yielded by the pentodes 83, 85 and 87, respectively with the R—Y, B—Y and G—Y color difference signals developed at the output terminals 96, 97 and 98, respectively.

Figure 4:
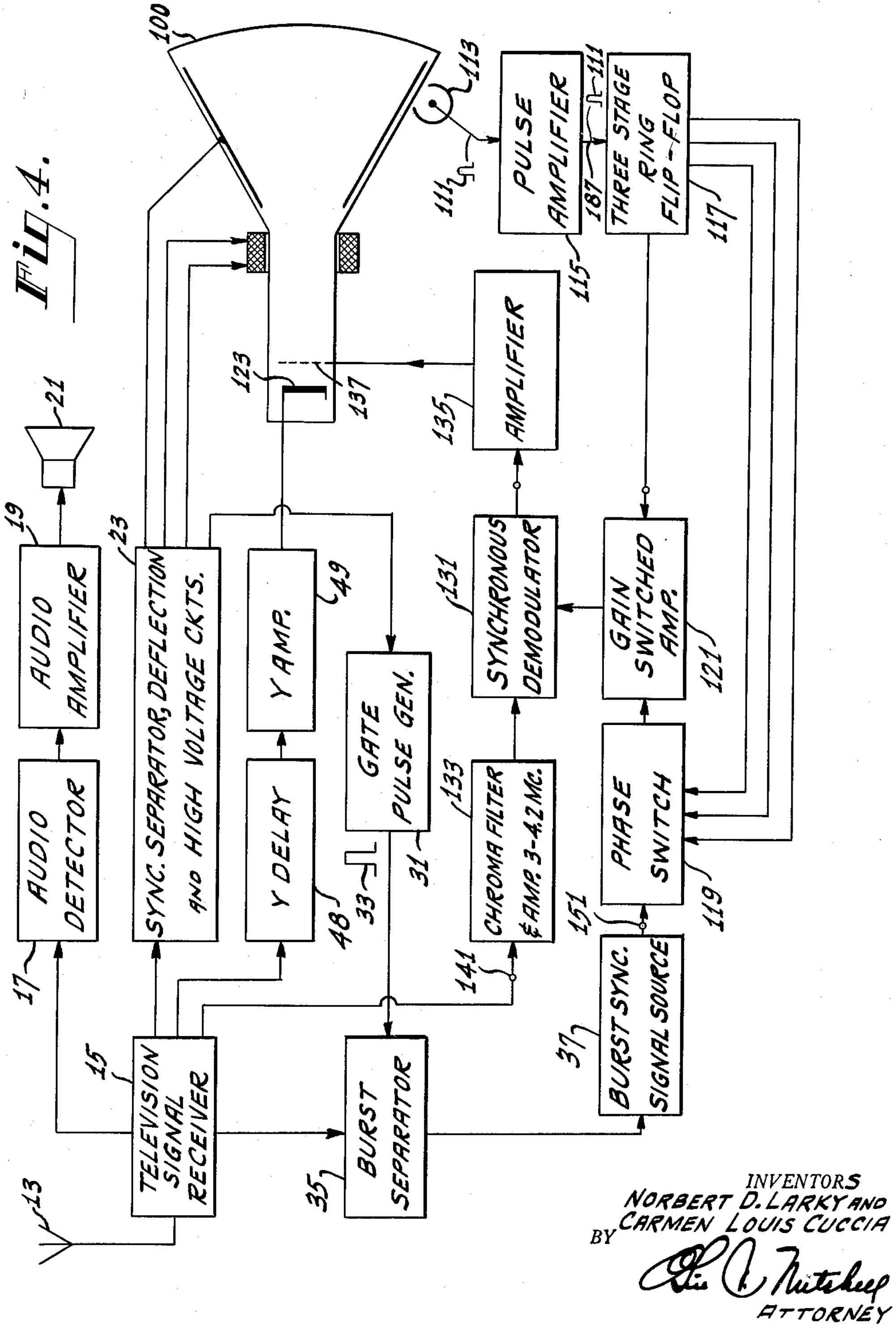
Figure 4 is a block diagram of a color television receiver utilizing the present invention for color balance.

Figure 4 is a block diagram of a color television receiver utilizing a sequential type color kinescope 100. This kinescope 100 has, for example, a target area whereon are arrayed vertical phosphor strips of the type shown in Figure 5. In one arrangement of phosphor strips, a green phosphor strip 101 is followed by a red phosphor strip 103 which is, in turn, followed by a blue phosphor strip 105. The color, green, red and blue refers to the color of the light emitted by these phosphor strips responsive to impingement on these phosphor strips by an electron beam. Each trio of phosphor strips is followed by another trio with the green phosphor strip 101 of one trio following the blue phosphor strip 105 of the preceding trio. A single electron beam is caused to scan the target area along the path such as the dotted line path 107. The color information is applied to the electron beam so that when electron beam impinges on, say the green phosphor strip, green color image information is used to modulate the electron beam. When the electron beam traverses the red phosphor strip 103, red color image information is caused to modulate the electron beam and so on. The synchronizing of color information to the electron beam when the impinging of the electron beam on each of the phosphor strips is performed, for example, by use of the indexing strips 109 which are positioned typically along the center of the green phosphor strip 101. When the electron beam impinges on these indexing strips, a series of pulses of ultraviolet light are emitted. These pulses of ultraviolet light will generate the pulses 111 in the photocell 113 of Figure 4.

Returning to the block diagram of Figure 4, the pulses 111 are applied to the pulse amplifier 115 and utilized to actuate the three stage ring flip-flop circuit 117. The three stage ring flip-flop circuit 117 will thereupon control both the phase switch circuit 119 and the gain switched amplifier 121. These circuits 119 and 121 control the amplitude of the demodulated color information in the television circuit in accordance with the teachings of the present invention.

The block diagram of Figure 4 representing a color television receiver has many similar circuits to those described in connection with Figure 1. Circuits having the same functions are assigned the same numerals. However, kinescope 100 is a single beam kinescope; this single beam traverses the target area and produces pulses 111 in the manner described in connection with Figure 5.

The luminance or Y information is applied to the cathode 123 of the kinescope 100 by way of the Y delay line 48 and the Y amplifier 49. The synchronous demodulator 131 accepts a chrominance signal from the chroma filter and amplifier 133; however, unlike the color television receiver of Figure 1 where three color difference signals are produced simultaneously, the synchronous demodulator 131 is caused to produce a sequence of color difference signals which are demodulated or produced in synchronism with the instantaneous position of the electron beam on the target area of the kinescope 100. Although the synchronous demodulator 131 differs from the demodulator 41 of Figure 1 in type of output signal, the process of synchronous demodulation is still the same. A unique method of producing a sequence of signals from the synchronous demodulator 131 involves the applying of a sequence of properly phased reference or synchronous demodulating signals to the synchronous demodulator 131 which may constitute a single synchronous demodulator tube of the type illustrated, for example, by the pentode 83 of Figure 3. The synchronous demodulator 131, being a single synchronous demodulator device responsive to both the chrominance signal and the sequence of synchronous demodulating reference signals, thereupon develops a sequence of color difference signals corresponding to the phases of the sequence of synchronous demodulating signals. This sequence of synchronous demodulating reference signals, assuming for the moment that they are produced in synchronism with location of the impingement of the electron beam on the target area, is applied through the amplifier 135 which may contain D.-C. restorer circuits, to the control grid 137 of the kinescope 100.

The sequence of synchronous demodulating reference signals is controlled by the phase switch 119 to which is applied the reference signal from the burst sync signal source 37 and also switching signals from the three stage ring flip-flop circuit 117, these switching signals being synchronized by the pulses 111 developed by the electron beam impinging on the indexing strips.

The sequence of synchronous demodulating signals developed by the phase switch 119 may not be each of correct amplitude to provide for color balance in the kinescope 100. The color difference information signals in the chrominance signal have different amplitude levels and the light emission efficiencies of the various phosphors of different color on the kinescope target area differ; it is therefore required that certain of the component color signals have greater amplitude level than others to make up for these differences to thereby provide color balance of the image reproduced by the kinescope 100. Each of the sequence of color difference signals developed by the synchronous demodulator 131 may be adjusted in amplitude to provide color balance by passing the sequence of synchronous demodulating signals from the phase switch 119 through a gain switched amplifier 121 before being applied to the synchronous demodulator 131. The gain of the gain switched amplifier 121 is sequentially controlled by the three stage ring flip-flop circuit 117.

Figure 6 is a schematic diagram of one form of the chroma filter and amplifier 133, the synchronous demodulator 131, the phase switch 119, the gain switched amplifier 121 and the three stage ring flip-flop 117 of Figure 4.

The chroma filter 133 is supplied with the demodulated color television signal at its input terminal 141. This demodulated color television signal is filtered by the resonant circuit 143 which selects those frequency components to be utilized as the chrominance signal. The chrominance signal is amplified in the tube 145 and developed across the output resonant circuit 147. The amplified chrominance signal is thereupon applied to one grid of the pentode 149 which constitutes the synchronous demodulating device of the synchronous demodulator 131. The sequence of synchronous demodulating reference signals from the gain switched amplifier 121 is applied to another grid of the pentode 149. The reference signal, having, for example, the phase of the $G-Y$ color difference signal in the chrominance signal is applied to the input terminal 151 of the phase switch 119. The phase switch 119 consists, in one form, of the pair of delay lines 153 and 155 and the rectifiers 157, 159, and 161. It follows from the schematic diagram of Figure 6 that if, for example, a positive pulse 163 from the three stage ring flip-flop 117 is utilized to raise the potential of the anode of the rectifier 157 above the cathode of that rectifier while each of the other rectifiers 159 and 161 are biased to be nonconducting, then the refence signal at the phase applied to the input terminal 151 passes through the rectifier 157 to the control grid of the pentode 165 of the gain switched amplifier 121. When the pulse 163 subsides and the next pulse 167 is supplied by the three stage ring flip-flop 117 to the rectifier 159, the reference signal delayed by delay line 163, passes through rectifier 159 to the control grid of pentode 165. In like fashion, when pulse 167 subsides and pulse 169 is applied to the rectifier 161, the reference signal delayed by both delay lines 153 and 155 will pass to the control grid of the pentode 165. The delay lines 153 and 155 are designed to provide time delays corresponding to the other color difference signals desired in the color sequence, such as the $R-Y$ and $B-Y$ signals.

The gain switched amplifier 121 includes the aforementioned pentode 165 to whose control grid the sequence of synchronous demodulating signals from the phase switch 119 are applied. The input circuit of the pentode 165 includes the resonant circuit 171 which is tuned to the frequency of the reference signal. The output circuit of the pentode 165 includes the resonant circuit 173, also tuned to the frequency of the reference signal. The ouput circuit of pentode 165 is coupled to the pentode 149 of the synchronous demodulator 131. The bias on the control grid of the pentode 165 is controlled by the three stage ring flip-flop 117 so that color balance can be achieved.

The three stage ring flip-flop circuit 117 which provides the sequence of pulses 163, 167 and 169 to the phase switch 119 and also gain switching signals such as the bias pulses, to be described, to the gain switched amplifier 121 operates typically in the following fashion; three bistable circuits of the flip-flop type are utilized, namely, circuits 181, 183, and 185; these bistable circuits utilize operational principles which are well known in the communications art. The pulse 111 from the pulse amplifier 115, as applied to the input terminal 187, triggers the first bistable amplifier 181. This bistable circuit 181 produces the pulse 163 and also a bias pulse at the terminal 191. This bias pulse is utilized to bias the control grid of pentode 165. The amplitude of this biasing pulse is controled by potentiometer 193. When the first bistable circuit 181 has completed the formation of pulse 163, bistable circuit 183 is triggered by way of condenser 195. Pulse 167 is thereupon developed by bistable circuit 183 with a biasing pulse furnished to the control grid of pentode 165 by this bistable circuit by way of terminal 191 utilizing potentiometer 197 for control. When pulse 167 subsides, bistable circuit 183 triggers bistable circuit 185 by way of condenser 199; bistable circuit 185 generates both pulse 169 and supplies a biasing pulse for the control grid of pentode 165. The biasing pulse produced by bistable circuit 185 is controlled in magnitude by potentiometer 201. Once pulse 169 has subsided, the three stage ring flip-flop 117 will remain quiescent until the next pulse 111 from the kinescope 100 appears and starts the cycle all over again. The biasing pulses are adjusted in magnitude to sequentially alter the gain of the pentode 165 in accordance with color balance requirements.

It is to be appreciated that the operation and principles described in connection with the circuit of Figure 4 and the schematic diagram of Figure 6 illustrate only one means for accomplishing the present invention. Color balance, achieved by changing the amplitude of the sequence of synchronous demodulating signals by sequentially changing the amplitude of the synchronous demodulating reference signal applied to the pentode of 165 of Figure 4, may be accomplished utilizing other circuits.

Having described the invention, what is claimed is:

1. In combination, means providing a source of chrominance signals, a synchronous demodulator, means to apply said chrominance signals to said synchronous demodulator, means providing a source of reference signals coupled to apply said reference signals to said synchronous demodulator, and means for variably controlling the amplitude of the reference signals applied to said synchronous demodulator to variably control the amplitude of the demodulated color information signal from said synchronous demodulator as a function of the amplitude of said reference signal.

2. In a color television receiver adapted to receive color television signals including color synchronizing bursts, the combination of color synchronizing burst responsive means for developing a reference signal, the frequency and phase of which are a function of said color synchronizing bursts, means for developing a control signal indicative of the amplitude level of said color synchronizing bursts, means for utilizing said control signal for controlling the amplitude of said reference signal according to a determinable relationship, and means for utilizing selected phases of said amplitude controlled reference signal to cause the demodulation of color information signals corresponding to said selected phases from said color television signal.

3. In combination, a source of a subcarrier containing color information signals, a source of synchronous demodulating signals, means to heterodyne said subcarrier with selected phases of said synchronous demodulating signals to cause the demodulation of color information signals corresponding to said selected phases, and means to variably control the amplitude of said synchronous demodulating signals used for said heterodyning for variably controlling the amplitude of said demodulated color information signals.

4. In combination, a source of chrominance signals, a synchronous demodulator means, means to apply said chrominance to said synchronous demodulator means, a source of reference signals, means to apply selected phases of said reference signal to said synchronous demodulator means to cause synchronous demodulation of color difference signals corresponding to said selected phases, and means to cause the amplitude of said selected phases to vary according to a prescribed relationship with the signal strength of said chrominance signal.

5. In a color television receiver adapted to receive at least chrominance signals and color synchronizing bursts, the combination of a synchronous demodulator, means to apply said chrominance signal to said synchronous demodulator, color synchronizing burst responsive means to develop a reference signal, the frequency and phase of which are a function of said color synchronizing bursts, means for developing a signal consisting of a sequence of phases of said reference signal, means to selectively control the amplitude of each of said sequence of reference signals, and means to apply said amplitude controlled sequence of reference signals to said synchronous demodulator to develop a corresponding sequence of color information signals.

6. In a color television receiver adapted to receive color television signals including a chrominance signal and color synchronizing bursts, the combination of a chrominance signal channel, a demodulator circuit, means to apply said chrominance signal to said demodulator circuit by way of said chrominance signal channel, a burst-synchronized reference signal source, means to apply selected phases of said reference signal to said demodulator to cause said demodulator to demodulate color difference signals corresponding to said selected phases from said chrominance signal, means for developing a control signal indicative of the signal strength of said color synchronizing bursts, and means for utilizing said control signal for controliling the amplitude of said selected phases of said reference signal applied to said demodulator whereby the amplitude level of said color difference signals is caused to be substantially independent of the signal strength of said chrominance signal.

7. In a color television receiver adapted to receive a color television signal including at least a chrominance signal and color synchronizing bursts, an automatic chroma control circuit comprising in combination, means to separate said color synchronizing bursts from said color television signal, means utilizing said separated color synchronizing bursts to provide a substantially continuous reference signal, a demodulator means, means to apply said chrominance signal to said demodulator means, an amplifier and phase shift circuit means coupled between said reference signal developing means and said demodulator means for applying selected phases of said reference signal to said demodulator means, and means responsive to the amplitude of said color synchronizing bursts to control the amplitude of said selected phases of said reference signal by control of the gain of said amplifier and phase shift circuit means.

8. In a color television receiver adapted to receive a color television signal including at least a chrominance signal and color synchronizing bursts, an automatic chroma control circuit comprising in combination, means to separate said color synchronizing bursts from said color television signal, means utilizing said separated color synchronizing bursts to provide a substantially continuous reference signal, a demodulator means, means to apply said chrominance signal to said demodulator means, an amplifier means including phase shift circuits for supplying selected phases of said reference signal to said demodulator means to cause the synchronous demodulation of color difference signals corresponding to said selected phases from said chrominance signal, a detector circuit responsive to said separated color synchronizing bursts for developing a control signal indicative of the signal strength of said chrominance signal, and means for utilizing said control signal for controlling the gain of said amplifier means.

9. In a color television receiver adapted to receive a color television signal including a chrominance signal and color synchronizing bursts, the combination of a sequential type color image reproducer having a target area on which are arrayed groups of color phosphor areas including indexing strips, said color image reproducer also including a scanning electron beam, means responsive to the condition of said electron beam impinging on said indexing strips to develop first control signals indicative of the position of said electron beam relative to each of said phosphor areas, a synchronous demodulator, means to apply said chrominance signal to said synchronous demodulator, means to develop a reference signal from said color synchronizing bursts, means responsive to said first control signal to generate a sequence of selected phases of said reference signal in synchronism with the instantaneous location of the impingement of said electron beam on said color phosphor areas, means responsive to said first control signal to sequentially control the amplitude of each of said sequence of reference signal, means to apply said sequence of amplitude controlled reference signals to said synchronous demodulator to cause the synchronous demodulation of a sequence of color information signals from said chrominance signal, each signal of said sequence corresponding to one of said selected phases, and means to apply said sequence of color information signals to said color image reproducer.

10. In a color television receiver adapted to receive a color television signal including a chrominance signal and color synchronizing bursts, the combination of, an image reproducer having a scanning electron beam, means to develop first control signals indicative of the instantaneous position of said electron beam, a synchronous demodulator, means to apply said chrominance signal to said synchronous demodulator, means to develop a reference signal from said color synchronizing bursts, means responsive to said first control signal to generate a sequence of selected phases of said reference signal in synchronism with the instantaneous location of said electron beam, means responsive to said first control signal to control the amplitude of each of said sequence of reference signal as it is developed, means to apply said sequence of amplitude controlled reference signals to said synchronous demodulator to cause the synchronous demodulation of a sequence of color information signals from said chrominance signal corresponding to each of said selected phases.

11. In a color television receiver adapted to receive at least chrominance signals and color synchronizing bursts, the combination of, a plurality of color demodulators each having at least an output electrode, a first control electrode and a second control electrode, means to apply said chrominance signal to each of said first control electrodes, color synchronizing burst responsive means to develop a reference signal the frequency and phase of which is related to that of said color synchronizing bursts, means to apply a selected phase of said reference signal to each of said second control electrodes of said color demodulators to cause a color information signal corresponding to that selected phase to be developed at the output electrode of said color demodulator, means responsive to said color synchronizing bursts to control the amplitude of each of said selected phases of said reference signal applied to the second control electrodes of said color demodulators.

12. In a color television receiver adapted to receive at least chrominance signals and color synchronizing bursts, the combination of, a plurality of color demodulators each having at least an output electrode, a first control electrode and a second control electrode, means to apply said chrominance signal to each of said first control electrodes, color synchronizing burst responsive means to develop a reference signal the frequency and phase of which is related to that of said color synchronizing bursts, means to apply a selected phase of said reference signal to each of said second control electrodes of said color demodulators to cause a color information signal corresponding to that selected phase to be developed at the output electrode of said color demodulator, means to detect said color synchronizing bursts and to develop therefrom a control signal indicative of the amplitude of said color synchronizing bursts, means responsive to said control signal to adjust the amplitude of said developed reference signal whereby the signal strength of the color difference signals developed at the output electrodes of said color demodulators varies in accordance with a prescribed relationship with respect to the amplitude of said color synchronizing bursts.

13. In a color television receiver for receiving a television radio carrier wave modulated by a composite color television signal having a periodically recurrent line synchronizing pulse component, a color burst component comprising individual periodic bursts of a fixed signal frequency, and of a periodicity equal to that of said line synchronizing pulse component, a brightness component, and a chrominance component: a carrier signal demodulation circuit operatively connected in said receiver for demodulating received television radio carrier waves to deliver demodulated color television signals having said components; reference signal generating means responsive to said color burst component of said composite color television signal to develop a reference signal having a frequency and phase which is a function of the frequency and phase of said color burst component; color signal demodulation means coupled to said carrier signal demodulation circuit to receive the chrominance component of said composite color television wave and coupled to said reference signal generating means to receive said reference signal and responsive to variations in the amplitude of said reference signal to produce corresponding amplitude variations in the demodulated output signal; and means for adjusting the amplitude of the reference signals applied to said color signal demodulating means to selectively control the amplitude of said demodulated output signal.

14. In a color television receiver for receiving a television radio carrier wave modulated by a composite color television signal having a periodically recurrent line synchronizing pulse component, a color burst component comprising individual periodic bursts of a fixed signal frequency, and of a periodicity equal to that of said line synchronizing pulse component, a brightness component, and a chrominance component: a carrier signal demodulation circuit operatively connected in said receiver for demodulating received television radio carrier waves to deliver demodulated color television signals having said components; reference signal generating means responsive to said color burst component of said composite color television signal to develop a reference signal having a frequency and phase which is a function of the frequency and phase of said color burst component; color signal demodulating means coupled to said carrier signal demodulation circuit to receive the chrominance component of said composite color television wave and coupled to said reference signal generating means to receive said reference signal to produce demodulated output signals; means for deriving an automatic chroma control voltage representative of the amplitude variations of said chrominance signal component, and means responsive to said automatic chroma control voltage for controlling the amplitude of said reference signal applied to said demodulating means.

References Cited in the file of this patent

UNITED STATES PATENTS

| | | |
|---|---|---|
| 2,635,140 | Dome | Apr. 14, 1953 |
| 2,757,229 | Larky | July 31, 1956 |
| 2,798,900 | Bradley | July 9, 1957 |
| 2,824,172 | Cherry | Feb. 18, 1958 |
| 2,858,367 | Rhodes | Oct. 28, 1958 |
| 2,879,327 | Sonnenfeldt | Mar. 24, 1959 |

OTHER REFERENCES

RCA Review, June 1953, pages 206 and 207.
Electronics Magazine, February 1954, page 142.